(12) United States Patent
Doy et al.

(10) Patent No.: US 12,464,622 B2
(45) Date of Patent: Nov. 4, 2025

(54) SYSTEM AND METHOD FOR OPERATING INDICATOR LIGHTS OF WORK MACHINES

(71) Applicant: Caterpillar Paving Products Inc., Brooklyn Park, MN (US)

(72) Inventors: Nathaniel Doy, Maple Grove, MN (US); Micheal David Valerio, Morton, IL (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 237 days.

(21) Appl. No.: 18/327,988

(22) Filed: Jun. 2, 2023

(65) Prior Publication Data

US 2024/0407067 A1 Dec. 5, 2024

(51) Int. Cl.
*H05B 47/10* (2020.01)
*G01J 1/42* (2006.01)
*H05B 47/11* (2020.01)

(52) U.S. Cl.
CPC .......... *H05B 47/11* (2020.01); *G01J 1/4204* (2013.01)

(58) Field of Classification Search
CPC ...... H05B 47/10; H05B 47/11; H05B 47/115; H05B 47/125; H05B 45/10; G01J 1/4204
See application file for complete search history.

(56) References Cited

U.S. PATENT DOCUMENTS

| | | |
|---|---|---|
| 10,421,396 B2 | 9/2019 | Hanson et al. |
| 10,472,090 B2 | 11/2019 | Kessler et al. |
| 10,787,177 B2 | 9/2020 | Fritz et al. |
| 2016/0273726 A1* | 9/2016 | Adler ............... H05B 45/20 |
| 2018/0236928 A1* | 8/2018 | Fritz ................. B60Q 1/245 |
| 2021/0094585 A1 | 4/2021 | Yamasaki et al. |
| 2021/0129740 A1 | 5/2021 | Kato et al. |
| 2021/0402918 A1* | 12/2021 | Demski ............. B60Q 1/24 |
| 2022/0080879 A1 | 3/2022 | Moon et al. |

FOREIGN PATENT DOCUMENTS

WO 2021/081655 A1 5/2021

* cited by examiner

Primary Examiner — Jimmy T Vu

(57) ABSTRACT

A method, for operating an indicator light mounted to an exterior of a work machine, includes receiving, by a controller, a digital input image of an environment surrounding the work machine from an image capturing device. Also, the method includes processing, by the controller, the digital input image to determine an ambient light intensity of the environment. In addition, the method includes generating, by the controller, based on the determined ambient light intensity of the environment, one or more control signals to correspondingly adjust at least one attribute of light output by the indicator light.

17 Claims, 6 Drawing Sheets

SYSTEM AND METHOD FOR OPERATING INDICATOR LIGHTS OF WORK MACHINES

TECHNICAL FIELD

The present disclosure relates to operating work machines. More particularly, the present disclosure relates to controlling one or more indicator lights of a work machine operating at a worksite.

BACKGROUND

A worksite, such as a mining or construction site, typically includes a variety of work machines, such as dozers, excavators, dump trucks, and the like, working cooperatively to accomplish a particular task. In order to accomplish the task safely and efficiently, operational statuses and/or modes (e.g., availability status, mechanical status, manned operating mode, unmanned operating mode, etc.) of the work machine should be conveyed to the other work machines and/or personnel operating in its vicinity, or to an associated entity located outside of the worksite, for example, to an operator stationed at a remote-control station.

For this purpose, the work machine may be equipped with one or more indicator lights mounted to an exterior of the work machine. Such indicator lights may be illuminated in a manner to convey the corresponding operational statuses and/or modes of the work machine. Controlling illumination of these indicator lights is crucial for improving safety and productivity of the work machines operating at the worksite.

U.S. Publication No. 2022/0080879 discloses a method for displaying notifications on a display of an autonomous vehicle. The method includes a step of determining when the vehicle is between a first distance and a second distance of a location. The second distance is less than the first distance. The method further includes a step of displaying a first notification when the vehicle is determined to be between the first distance and the second distance of the location. The method further includes a step of determining when the vehicle is less than the second distance from the location. In addition, the method includes a step of displaying a second notification when the vehicle is determined to be less than the second distance from the location. The second notification provides additional information not provided by the first notification. Further, the method includes a step of determining a brightness of the first or the second notification based current weather conditions.

SUMMARY OF THE INVENTION

In one aspect, the disclosure relates to a method for operating an indicator light mounted to an exterior of a work machine. The method includes receiving, by a controller, a digital input image of an environment surrounding the work machine from an image capturing device. Also, the method includes processing, by the controller, the digital input image to determine an ambient light intensity of the environment. In addition, the method includes generating, by the controller, based on the determined ambient light intensity, one or more control signals to correspondingly adjust at least one attribute of light output by the indicator light.

In another aspect, the disclosure is directed to a system for operating an indicator light mounted to an exterior of a work machine. The system includes an image capturing device and a controller. The image capturing device is configured to capture a digital input image of an environment surrounding the work machine. The controller is operatively coupled to the image capturing device. The controller is configured to receive the digital input image. Also, the controller is configured to process the digital input image to determine an ambient light intensity of the environment. In addition, the controller is configured to generate, based on the determined ambient light intensity of the environment, one or more control signals to correspondingly adjust at least one attribute of light output by the indicator light.

In yet another aspect, the disclosure relates to a work machine. The work machine includes an exterior, an indicator light mounted to the exterior, and a system for operating the indicator light. The indicator light is configured to output light indicative of an operating status of the work machine. The system includes an image capturing device and a controller. The image capturing device is configured to capture a digital input image of an environment surrounding the work machine. The controller is operatively coupled to the image capturing device. The controller is configured to receive the digital input image. Also, the controller is configured to process the digital input image to determine an ambient light intensity of the environment. In addition, the controller is configured to generate, based on the determined ambient light intensity of the environment, one or more control signals to correspondingly adjust at least one attribute of light output by the indicator light.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1', 101 and 201 could refer to one or more comparable components used in the same and/or different depicted embodiments.

Figure 1:
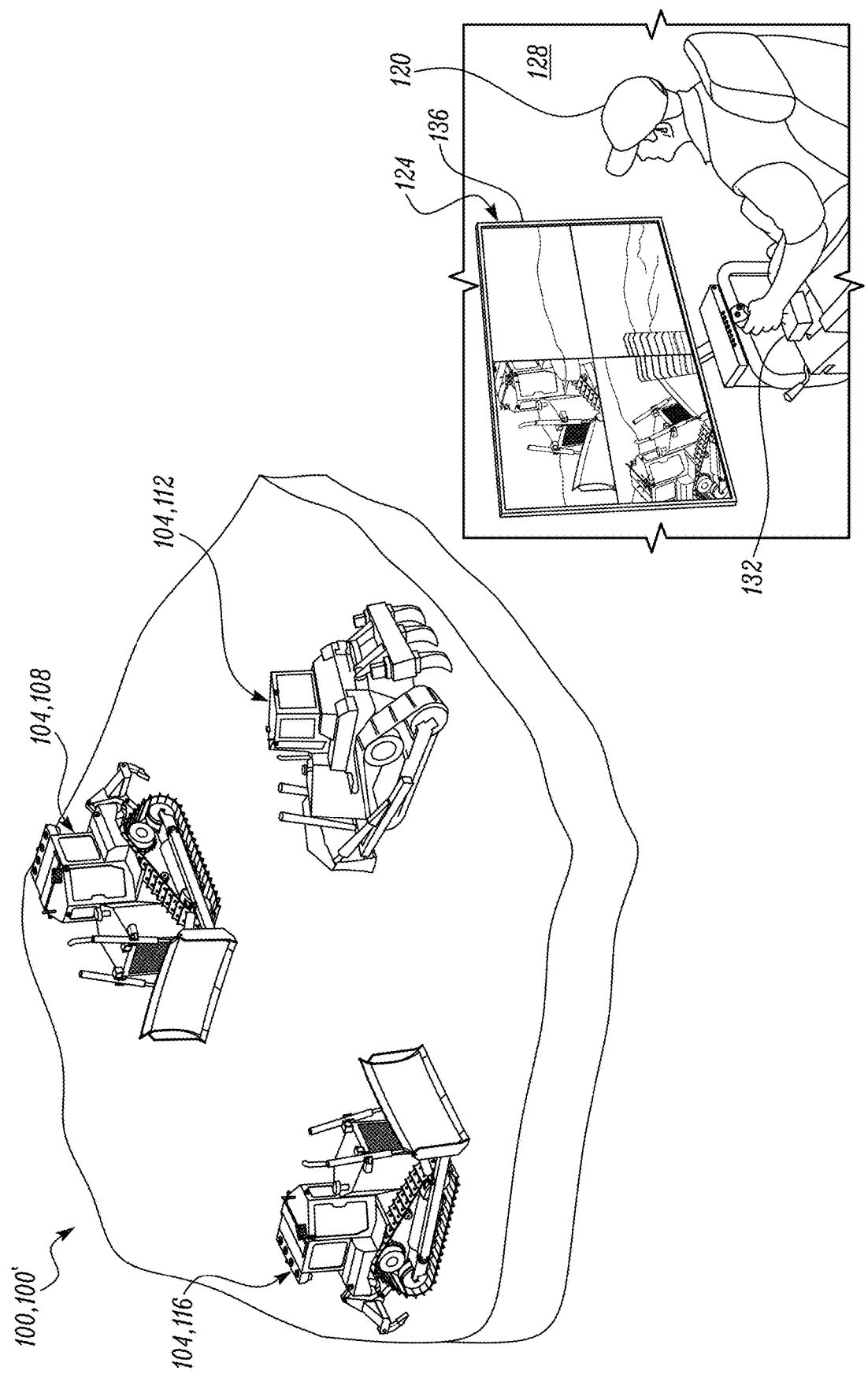
FIG. 1 illustrates an exemplary worksite and an operator operating, via an off-board control system located at a remote control station, at least one work machine to perform a task at the worksite, in accordance with an embodiment of the present disclosure.

Referring to FIG. 1, an exemplary worksite 100 is shown. For the purpose of the ongoing description, the worksite 100 is described and depicted as a mining site 100'. However, it should be noted that the scope of the disclosure is not limited to the worksite 100 as the mining site 100' and therefore, the worksite 100 may include any other type of work surfaces known in the art, such as a landfill, a quarry, a construction site, and the like.

A number of work machines 104 (hereinafter referred to as "machines 104") may cooperatively operate at the worksite 100 to accomplish a variety of tasks. The machines 104 may include, but are not limited to, haul trucks, excavators, wheel loaders, track-type tractors, shovels, drilling machines, and the like. The tasks may be associated with altering geography at the worksite 100 and may include, but are not limited to, dozing tasks, hauling tasks, dumping tasks, loading tasks, and the like. For explanatory purposes, as shown in FIG. 1, three machines 104, namely a first track-type tractor 108, a second track-type tractor 112, and a third track-type tractor 116, are shown operating at the worksite 100 to accomplish a dozing task. However, it may be contemplated that a number and type of machines 104 operating at the worksite 100 may vary based on the task requirements.

The machines 104 (e.g., the first track-type tractor 108, the second track-type tractor 112, the third track-type tractor 116) may be semi-autonomous, or manually operated. In an exemplary embodiment, as shown in FIG. 1, the first track-type tractor 108 is remotely controlled, via an operator 120 operating an off-board control system 124 located at a control station 128. The off-board control system 124 may house various components and controls, for example, a joystick 132 and a display device 136, access to one or more of which may help the operator 120 to control movements and/or operations of the first track-type tractor 108. The control station 128 may be either located at the worksite 100 or at a location that is distant from the worksite 100. In some embodiments, at least one of the machines 104 may be an autonomous machine.

It should be noted that, in the exemplary embodiment, as shown in FIG. 1, the machines 104 are of the same type, i.e., each of the first track-type tractor 108, the second track-type tractor 112, and the third track-type tractor 116 have similar components and are similar in construction. In other embodiments, the machines 104 employed at the worksite 100 may be of different types.

Figure 2:
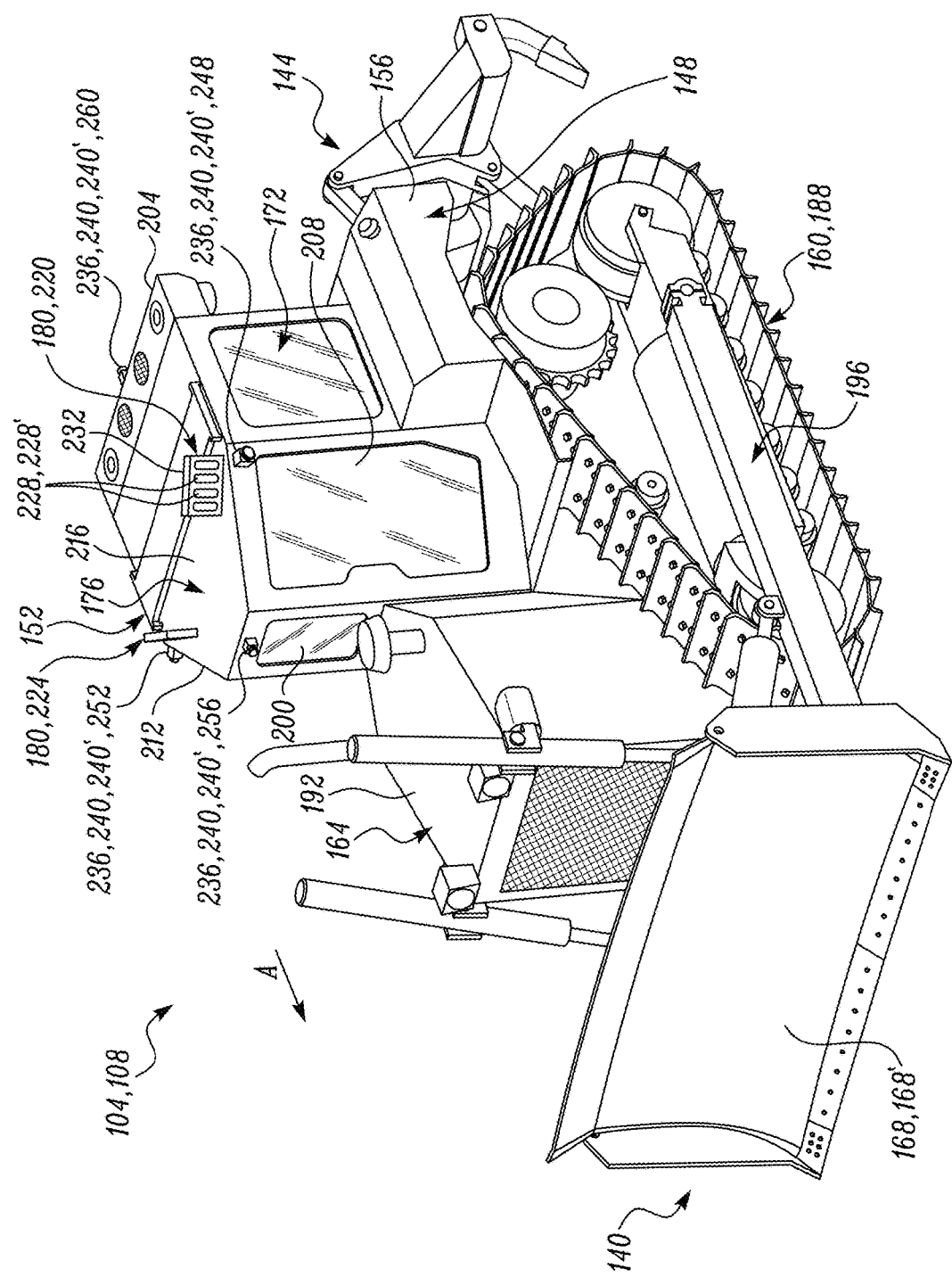
FIG. 2 illustrates the at least one work machine including indicator lights, in accordance with an embodiment of the present disclosure.

For explanatory purposes, the first track-type tractor 108 will now be explained in detail with reference to FIG. 2. However, it should be noted that the description provided below for the first track-type tractor 108 is equally applicable to the other track-type tractors, i.e., the second track-type tractor 112, and the third track-type tractor 116, without any limitations.

The first track-type tractor 108 (or the machine 104) may define a forward end 140 and a rearward end 144 opposite to the forward end 140. The forward end 140 and the rearward end 144 may be defined in relation to an exemplary direction of travel of the machine 104 (indicated by an arrow 'A'), with said direction of travel being defined from the rearward end 144 towards the forward end 140. Also, the first track-type tractor 108 may define two lateral sides, i.e., a first lateral side 148 (or left side) and a second lateral side 152 (or right side) opposite to the first lateral side 148. The first lateral side 148 and the second lateral side 152 may be located transversely relative to the exemplary direction of travel 'A' of the first track-type tractor 108.

The first track-type tractor 108 (or the machine 104) may include a main frame 156, ground-engaging members 160, a power source 164, at least one implement 168, and an operator cabin 172. Also, the first track-type tractor 108 (or the machine 104) includes an exterior 176 and an indicator light 180.

The main frame 156 may support and/or accommodate one or more components/assemblies of the first track-type tractor 108 (or the machine 104), such as the power source 164, the implement 168, and the operator cabin 172, although other known components and structures may be supported by the main frame 156, as well. The ground-engaging members 160 may support the main frame 156 on ground at the worksite 100. The ground-engaging members 160 may include a set of crawler tracks 188. The crawler tracks 188 may be configured to move and transport the first track-type tractor 108 from one location to another at the worksite 100, according to a customary practice known in the art. In the present embodiment, two crawler tracks 188 are provided, one on each side of the first track-type tractor 108. In other embodiments, the ground-engaging members 160 may include wheeled units (not shown) provided either alone or in combination with the crawler tracks 188.

The power source 164 may include a power compartment 192 and a prime mover (not shown) provided within the power compartment 192. The prime mover may embody a combustion engine, such as a diesel engine, a gasoline engine, a gaseous fuel powered engine (e.g., a natural gas engine), or any other type of combustion engine known in the art. The prime mover may alternatively embody a non-combustion source of power, for example, a fuel cell or a power storage device such as a battery unit. The prime mover may be configured to generate an output power required to operate various systems and/or sub-systems on the first track-type tractor 108 (or the machine 104), such as the ground-engaging members 160.

The implement 168 may be connected to the main frame 156, for example, via a linkage assembly 196. The implement 168 may be used to engage, penetrate, or cut a work surface at the worksite 100. In some examples, the implement 168 may be used to perform at least one of, but not limited to, a grading operation, a scraping operation, a leveling operation, a material removal operation, or any other type of geography altering operation at the worksite 100. In the present embodiment, the implement 168 is embodied as a blade 168'.

The operator cabin 172 may be supported over the main frame 156. The operator cabin 172 may facilitate stationing of one or more operators therein, to monitor one or more operations of the first track-type tractor 108 (or the machine 104) performing a task (e.g., dozing task). Also, the operator cabin 172 may house various components and controls of the first track-type tractor 108 (or the machine 104), access to one or more of which may help the operators to control the movement and/or operation of the first track-type tractor 108. For example, the various components and controls may include, but are not limited to, steering wheels, touch screens, display devices, joysticks, and switches.

The operator cabin 172 may include a front portion 200, a rear portion 204, a left-hand portion 208, a right-hand portion 212, and a roof portion 216. The rear portion 204 may be disposed opposite to the front portion 200. The front portion 200 and the rear portion 204 may be defined along the direction of travel 'A' of the first track-type tractor 108. Also, the front portion 200 and the rear portion 204 may be spaced apart from each other along the direction of travel 'A'. The front portion 200 may be disposed proximally relative to the forward end 140 and distally relative to the rearward end 144 of the first track-type tractor 108. The rear portion 204 may be disposed proximally relative to the rearward end 144 and distally relative to the forward end 140 of the first track-type tractor 108.

The left-hand portion 208 and the right-hand portion 212 may be located transversely relative to the direction of travel 'A' of the first track-type tractor 108. The left-hand portion 208 may be laterally opposite to the right-hand portion 212. The left-hand portion 208 may be disposed towards the first lateral side 148 and the right-hand portion 212 may be disposed towards the second lateral side 152, when viewed from the rearward end 144 towards the forward end 140 of the first track-type tractor 108. The roof portion 216 may extend between the rear portion 204 and the front portion 200 along the direction of travel 'A' of the first track-type tractor 108. Also, the roof portion 216 may extend between the left-hand portion 208 and the right-hand portion 212 transversely relative to the direction of travel 'A' of the first track-type tractor 108.

The exterior 176 may be defined by at least one of the front portion 200, the rear portion 204, the left-hand portion 208, the right-hand portion 212, and the roof portion 216. For instance, the exterior 176 is defined by the roof portion 216 of the operator cabin 172. The exterior 176 may facilitate mounting of various components and/or devices of the first track-type tractor 108 (or the machine 104). In another exemplary embodiment, the exterior 176 may be defined by at least one outer wall of the power compartment 192. In yet another exemplary embodiment, the exterior 176 may be defined by at least one outer surface of the main frame 156.

Two indicator lights 180, namely—a first indicator light 220 and a second indicator light 224 are mounted to the exterior 176 of the first track-type tractor 108 (or the machine 104). For example, the first indicator light 220 and the second indicator light 224 are mounted to the roof portion 216 of the operator cabin 172. The first indicator light 220 may be located proximally relative to the left-hand portion 208 and distally relative to the right-hand portion 212 of the operator cabin 172. The second indicator light 224 may be located proximally relative to the right-hand portion 212 and distally relative to the left-hand portion 208 of the operator cabin 172. It should be noted that an indicator light (similar to the indicator lights 180) contained within a recess or cavity of the exterior 176 will still be considered to be mounted to the exterior 176. Although, it is shown in FIG. 2, that two indicator lights 180 are mounted to the machine 104 (or the first track-type tractor 108), it may be contemplated that in other embodiments, a higher or a lower number of the indicator lights 180 may be mounted to the machine 104 as per the application requirements.

For explanatory purposes, the first indicator light 220 will now be explained in detail with reference to FIG. 2. However, it should be noted that the description provided below for the first indicator light 220 is equally applicable to the second indicator light 224, without any limitations. The first indicator light 220 may include one or more lighting units 228 and a housing 232 at least partially enclosing the lighting units 228. The lighting units 228 may be sequentially arranged with respect to each other within the housing 232. As shown in FIG. 2, four lighting units 228 are linearly arranged with respect to each other within the housing 232. In other embodiments, higher or lower number of the lighting units 228 maybe contemplated.

In the present embodiment, the lighting units 228 may include light emitting diodes (LEDs) 228'. However, it may be contemplated that, in other embodiments, the lighting units 228 may include, but not limited to, at least one of incandescent units (e.g., filament lamps, halogen lamps), fluorescent units, phosphorescent units, high-intensity discharge units (e.g., sodium vapor lamps, mercury vapor lamps, and metal halide lamps), laser units, pyro-luminescent units, and luminescent polymer units.

The first indicator light 220 is configured to output light indicative of an operating status of the first track-type tractor 108 (or the machine 104). The light outputted by the first indicator light 220 may have one or more attributes. In the present embodiment, the one or more attributes may include brightness (or intensity). In another embodiment, the one or more attributes may include color. For example, the four lighting units 228 of the first indicator light 220 may correspondingly output a red light, a blue light, a green light, and a yellow light. In yet another embodiment, the one or more attributes may include flashing sequence of the lighting units 228 of the first indicator light 220.

Examples of the operating status of the first track-type tractor 108 (or the machine 104) may include, but are not limited to, 'remote control active', 'operator inside the operator cabin', 'machine auto pause', 'machine slow down', 'machine emergency stop', and 'machine command override'. In an example, a red lighting unit of the lighting units 228 may be activated to indicate the 'machine emergency stop' status of the first track-type tractor 108 (or the machine 104). In another example, a green lighting unit of the lighting units 228 may be activated to indicate the 'operator inside the operator cabin' of the first track-type tractor 108 (or the machine 104). In yet another example, a blue lighting unit of the lighting units 228 may be activated to indicate the 'remote control active' status of the first track-type tractor 108 (or the machine 104). In yet another example, a yellow lighting unit of the lighting units 228 may be activated to indicate the 'machine slow down' status of the first track-type tractor 108 (or the machine 104). It should be noted that the lighting units 228 may be activated in any combination, pattern, sequence (e.g., flashing sequence), etc., to indicate corresponding operating statuses of the first track-type tractor 108 (or the machine 104).

Figure 3:
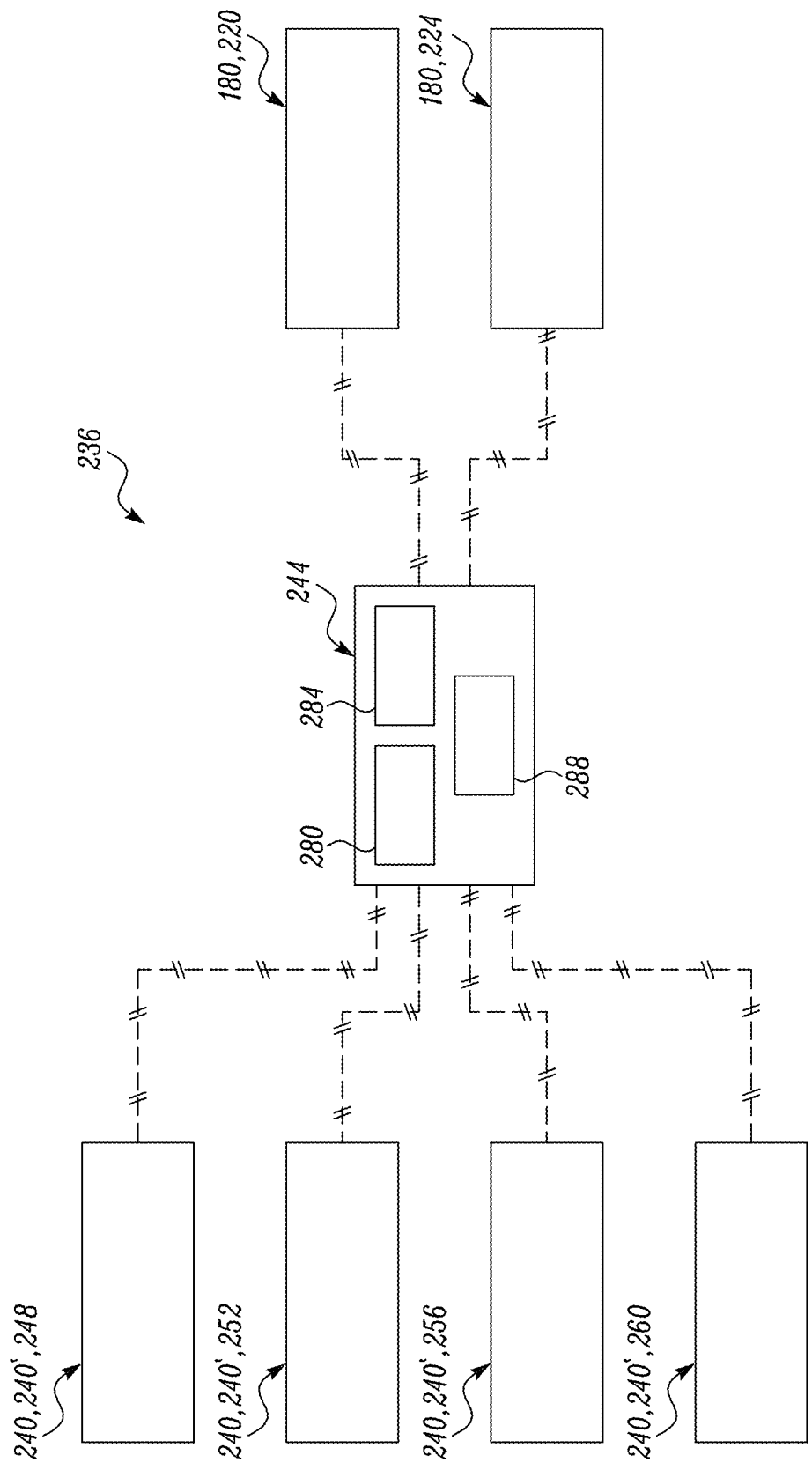
FIG. 3 illustrates a system for operating one or more of the indicator lights, in accordance with an embodiment of the present disclosure.

Referring to FIG. 3, a system 236 for operating the indicator lights 180 (e.g., the first indicator light 220 and the second indicator light 224) is discussed. The system 236 includes an image capturing device 240 and a controller 244. Each of the image capturing device 240 and the controller 244 is now discussed in detail.

The image capturing device 240 is configured to capture a digital input image of an environment surrounding the machine 104 (e.g., the first track-type tractor 108) at the worksite 100. It should be understood that the term "environment", as used herein, may refer to a portion of a region of the worksite 100 surrounding the machine 104. Also, the image capturing device 240 may be configured to obtain other types of visual feeds, such as video streams, time lapse sequences, etc., associated with one or more views of the machine 104 and/or the environment surrounding the machine 104.

In the present embodiment, the image capturing device 240 embodies a camera 240'. The camera 240' may be a monochrome digital camera, a high-resolution digital camera, or any suitable digital camera. Further, the camera 240' may include a still camera, a camcorder, a video camera, a Closed-Circuit Television (CCTV) camera, and the like, without any limitations. The camera 240' may also include optical flow chips that facilitate acquisition of images. In some examples, the camera 240' may embody a Complimentary Metal-Oxide Semiconductor (CMOS) camera.

In the present embodiment, four image capturing devices 240 (or cameras 240'), namely—a first image capturing device 248, a second image capturing device 252, a third image capturing device 256, and a fourth image capturing device 260, are mounted to the exterior 176 the first track-type tractor 108 (or the machine 104). For example, as shown in FIG. 2, the first image capturing device 248 is mounted to the left-hand portion 208 of the operator cabin 172, the second image capturing device 252 is mounted to the right-hand portion 212 of the operator cabin 172, the third image capturing device 256 is mounted to the front portion 200 of the operator cabin 172, and the fourth image capturing device 260 is mounted to the rear portion 204 of the operator cabin 172. These image capturing devices 248, 252, 256 and 260 serve to provide images which the machine operator 120 operating the off-board control system 124 can use to determine the position of the machine 104 (or the first track-type tractor 108) and whether any other machines 104 are in proximity thereto. Similarly, four image capturing devices (similar to the image capturing devices 240) may be mounted on the second track-type tractor 112 and the third track-type tractor 116.

Figure 4:
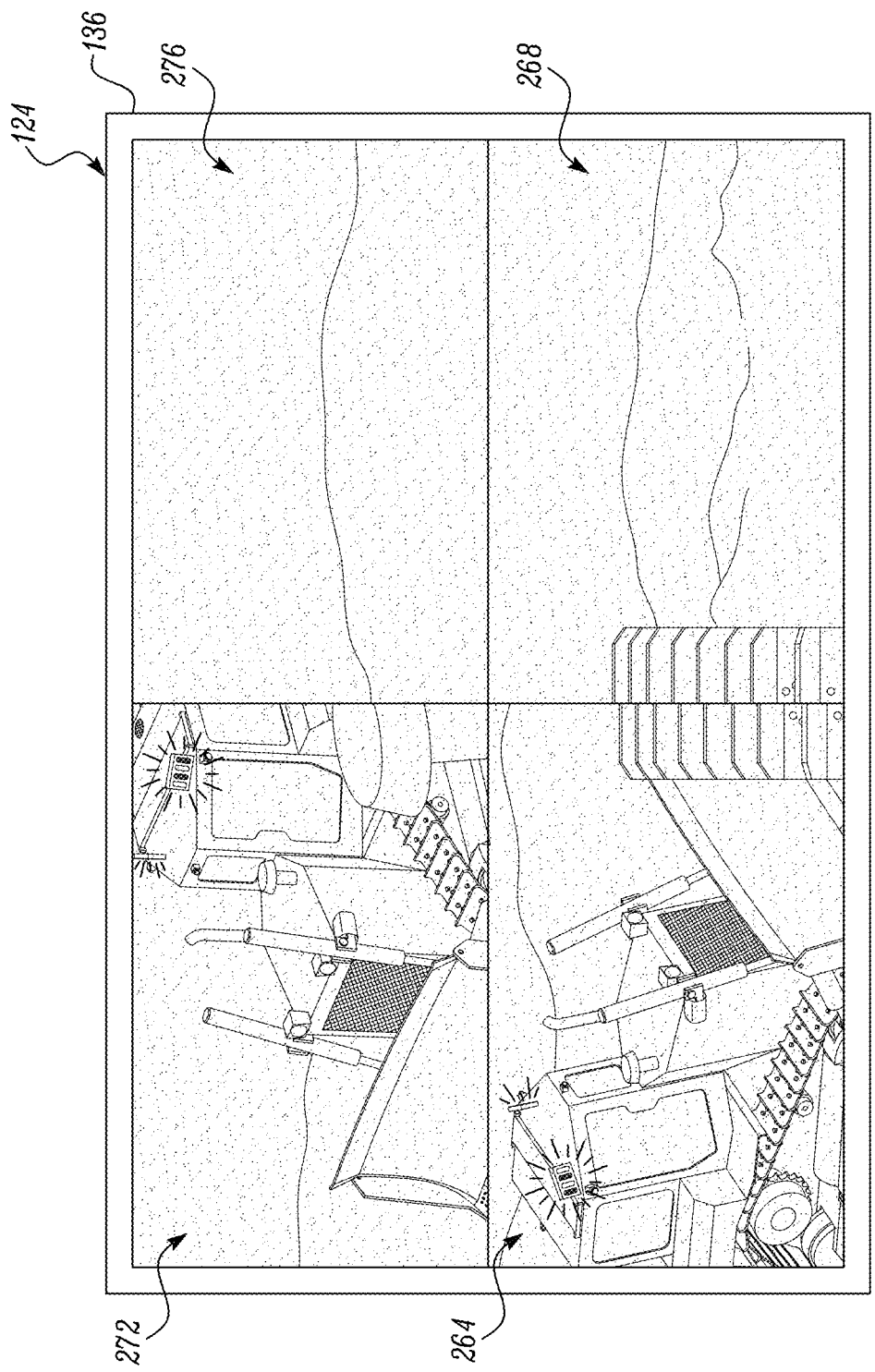
FIG. 4 illustrates a display device of the off-board control system providing different field of views captured by image capturing devices mounted to the at least one work machine operating in a high ambient lighting condition, in accordance with an embodiment of the present disclosure.
Figure 5:
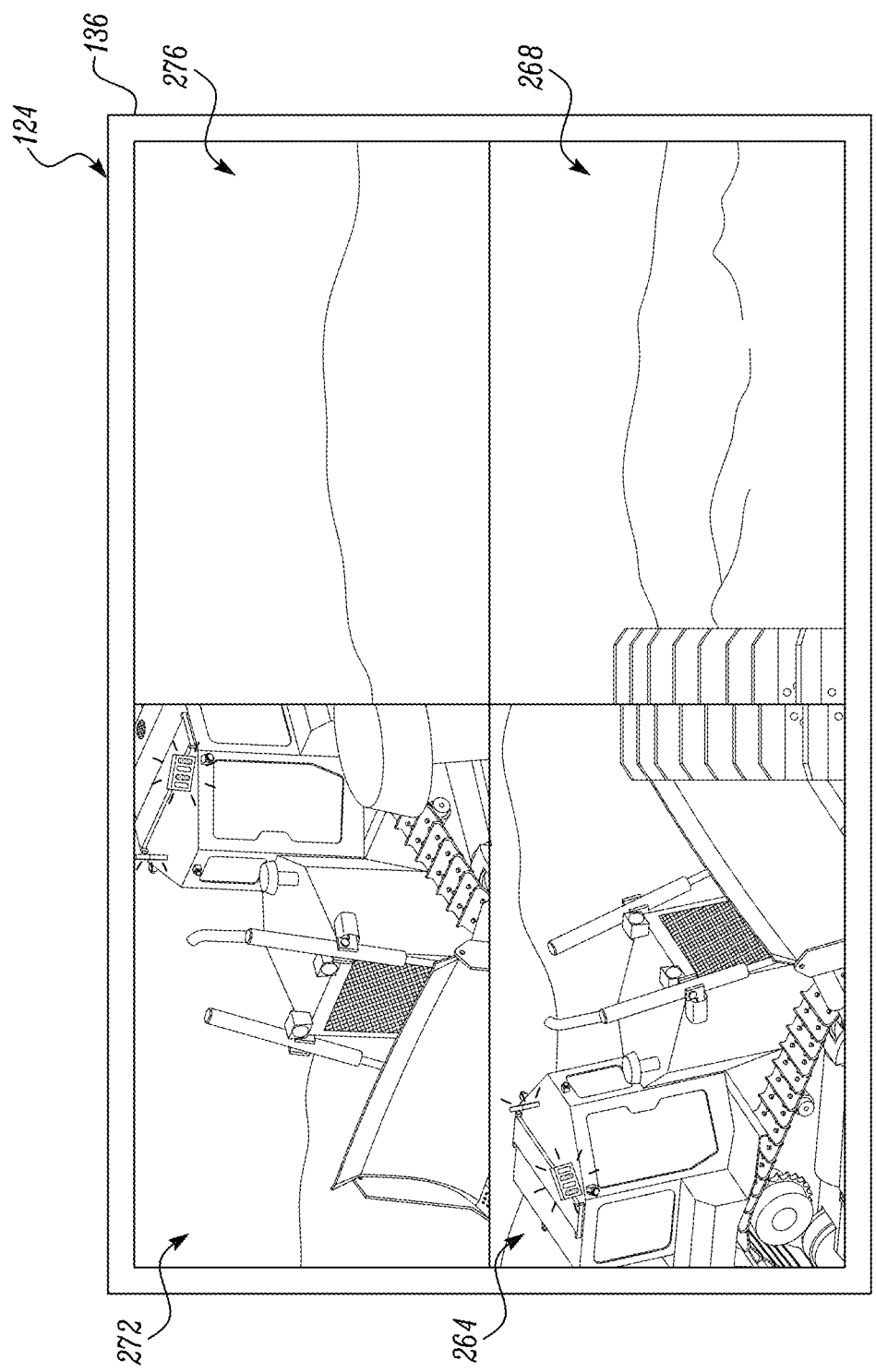
FIG. 5 illustrates the display device providing different field of views captured by the image capturing devices mounted to the at least one work machine operating in a low ambient lighting condition, in accordance with an embodiment of the present disclosure.

The first image capturing device 248 may be configured to capture a first digital input image covering a first field of view 264 (as shown in FIGS. 4 and 5) that may encompass the first lateral side 148 of the machine 104 (or the first track-type tractor 108) and a portion of the environment located towards the first lateral side 148. The second image capturing device 252 may be configured to capture a second digital input image covering a second field of view 268 (as shown in FIGS. 4 and 5) that may encompass the second lateral side 152 of the machine 104 (or the first track-type tractor 108) and a portion of the environment located towards the second lateral side 152. Similarly, the third image capturing device 256 may be configured to capture a third digital input image covering a third field of view 272 (as shown in FIGS. 4 and 5) that may encompass the forward end 140, a portion of the power compartment 192, and the implement 168 of the machine 104 (or the first track-type tractor 108), and a portion of the environment located towards the forward end 140. In addition, the fourth image capturing device 260 may be configured to capture a fourth digital input image covering a fourth field of view 276 (as shown in FIGS. 4 and 5) that may encompass the rearward end 144 of the machine 104 (or the first track-type tractor 108) and a portion of the environment located towards the rearward end 144. The first field of view 264, the second field of view 268, the third field of view 272, and the fourth field of view 276 may combinedly provide 360-degree coverage of the environment surrounding the machine 104 (e.g., the first track-type tractor 108).

It may be contemplated that, in other embodiments, the image capturing devices 240 may be mounted at any suitable location of the machine 104, as per the application requirements. Also, it should be understood that, in other embodiments, a higher or lower number of the image capturing devices 240 may be mounted to the machine 104.

The controller 244 is now discussed. The controller 244 is operatively coupled to one or more of the image capturing devices 240. For instance, the controller 244 is operatively coupled to the first image capturing device 248, the second image capturing device 252, the third image capturing device 256, and the fourth image capturing device 260. Also, the controller 244 is operatively coupled to one or more of the indicator lights 180. For example, the controller 244 is operatively coupled to the first indicator light 220 and the second indicator light 224.

The controller 244 is configured to receive the digital input image from at least one of the image capturing devices 240. For example, the controller 244 is configured to receive the first digital input image from the first image capturing device 248. In another example, the controller 244 is configured to receive the second digital input image from the second image capturing device 252. In yet another example, the controller 244 is configured to receive the third digital input image from the third image capturing device 256. In still another example, the controller 244 is configured to receive the fourth digital input image from the fourth image capturing device 260.

Upon receipt of the digital input image, the controller 244 is configured to process the digital input image to determine an ambient light intensity of the environment. In the present embodiment, the controller 244 processes the digital input image by computing an average intensity value of all pixels of the digital input image and using the computed average intensity value as the ambient light intensity of the environment. For example, upon receipt of the first digital input image from the first image capturing device 248, the controller 244 computes an average intensity value of all pixels of the first digital input image and uses the computed average intensity value of the first digital input image as the ambient light intensity of the environment. In another example, upon receipt of the second digital input image from the second image capturing device 252, the controller 244 computes an average intensity value of all pixels of the second digital input image and uses the computed average intensity value of the second digital input image as the ambient light intensity of the environment. It may be contemplated that, in other embodiments, the controller 244 may adapt any suitable computational technique and/or method known in the art for computing the average intensity value.

Further, the controller 244 is configured to generate one or more control signals to adjust at least one attribute of the one or more attributes, for example, brightness, of the light output by the indicator light 180. The controller 244 generates the control signals based on the determined ambient light intensity of the environment. The control signals are indicative of a desired value of at least one attribute of the light output by the indicator light 180 corresponding to the determined ambient light intensity of the environment. In the present embodiment, the controller 244 uses one or more datasets (stored in a memory 280 associated with the controller 244) to determine the desired value of the at least one attribute of the light output by the indicator light 180.

The datasets may include a look-up table that defines a correlation between different levels of the ambient light intensity (of the environment) and corresponding desired values of the at least one attribute of the light output by the indicator light 180. For instance, the look-up table may include: five different levels of the ambient light intensity (of the environment), namely—100% of the maximum ambient light intensity, 80% of the maximum ambient light intensity, 60% of the ambient light intensity, 40% of the maximum ambient light intensity, and 20% of the maximum ambient light intensity; and their corresponding five different values of brightness (of the indicator light 180), namely—maximum brightness value, 80% of the maximum brightness value, 60% of the maximum brightness value, 40% of the maximum brightness value, and 20% of the maximum brightness value. Although five different levels of the ambient light intensity of the environment and their corresponding five different desired values of brightness of the indicator light 180 are discussed with respect to the look-up table, it may be contemplated that the look-up table may include a higher or a lower number of levels of the ambient light intensity and their corresponding different desired values of brightness of the indicator light 180 for the controller 244 to refer to.

Upon determining the ambient light intensity of the environment, the controller 244 may use the look-up table to identify the level of the ambient light intensity. Based on the identified level of the ambient light intensity, the controller 244 may determine the corresponding desired value of the brightness of the light output by the indicator light 180 and accordingly generates the control signal to adjust the brightness of the light output by the indicator light 180 to the desired value. For instance, upon identifying the determined ambient light intensity (of the environment) equal to 80% of the maximum ambient light intensity (from the look-up table), the controller 244 determines the desired value of the brightness to be 80% of the maximum brightness value of the light output by the indicator light 180 and accordingly, generates the control signal(s) to adjust the brightness of the light output by the indicator light 180 to a value equal to 80% of the maximum brightness value (please see FIG. 4). In another instance, upon identifying the determined ambient light intensity (of the environment) equal to 40% of the maximum ambient light intensity, the controller 244 determines the desired value of the brightness to be 40% of the maximum brightness value of the light output by the indicator light 180 and accordingly, generates the control signal(s) to adjust the brightness of the light output by the indicator light 180 to a value equal to 40% of the maximum brightness value (please see FIG. 5).

Further, in some embodiments, the controller 244 may use one or more interpolation techniques (e.g., a linear interpolation technique) to determine one or more desired values (of the at least one attribute, e.g., brightness, of the light output by the indicator light 180) that corresponds to the ambient light intensities lying between any two levels of the above-mentioned five different levels of the ambient light intensity. For instance, upon determining the ambient light intensity to be 35% of the maximum ambient light intensity, the controller 244 may apply the interpolation technique, e.g., based on the brightness values corresponding to 40% of the maximum ambient light intensity and 20% of the maximum ambient light intensity to determine the desired value corresponding to the 35% of the maximum ambient light intensity. Accordingly, the controller 244 may generate the control signal(s) to adjust the attribute (e.g., brightness) of the light output by the indicator light 180 based on said desired value.

In some embodiments, to determine the desired value of the at least one attribute (e.g., brightness) of the light output by the indicator light 180, the controller 244 may use a look-up table that defines a correlation between different ranges of the ambient light intensity (of the environment) and corresponding desired values of the at least one attribute of the light output by the indicator light 180. For instance, the look-up table may include: five different ranges of the ambient light intensity (of the environment), namely—100%-81% of the maximum light intensity, 80%-61% of the maximum ambient light intensity, 60%-41% of the ambient light intensity, 40%-21% of the maximum ambient light intensity, and 20%-0% of the maximum ambient light intensity; and their corresponding five different values of brightness of the indicator light 180, namely −90% of the maximum brightness value, 70% of the maximum brightness value, 50% of the maximum brightness value, 30% of the maximum brightness value, and 10% of the maximum brightness value. Accordingly, upon determining the ambient light intensity of the environment, the controller 244 may use the look-up table to identify the desired range in which the determined ambient light intensity falls. Based on the identified desired range of the determined ambient light intensity, the controller 244 may determine the corresponding desired value of the brightness of the light output by the indicator light 180 and accordingly, generate the control signal (s) to adjust the brightness of the light output by the indicator light 180 to the desired value.

In some embodiments, the controller 244 may process the first digital input image (providing the first field of view 264 captured by the first image capturing device 248) and the second digital input image (providing the second field of view 268 captured by the second image capturing device 252) to determine the ambient light intensity of the environment surrounding the machine 104 (or the first track-type tractor 108). For instance, the controller 244 may process the first digital input image (by adapting the computational technique, as discussed above) to determine a first ambient light intensity of the environment and, may process the second digital input image (by adapting the computational technique, as discussed above) to determine a second ambient light intensity of the environment. Subsequently, the controller 244 may compute an average of the first ambient light intensity and the second ambient light intensity and hence, use the computed average as the ambient light intensity of the environment.

Additionally, in some embodiments, the controller 244 may also consider the third digital input image (providing the third field of view 272 captured by the third image capturing device 256) and the fourth digital input image (providing the fourth field of view 276 captured by the fourth image capturing device 260) to determine the ambient light intensity of the environment. In addition to processing the first digital input image and the second digital input image, the controller 244 may process the third digital input image to determine a third ambient light intensity of the environment and the fourth digital input image to determine a fourth ambient light intensity of the environment. Next, the controller 244 may compute an average of the first ambient light intensity, the second ambient light intensity, the third ambient light intensity, and the fourth ambient light intensity, and may use the computed average as the ambient light intensity of the environment.

In other embodiments, the controller 244 may determine a lowest ambient light intensity among the first ambient light intensity and the second ambient light intensity, and use the lowest ambient light intensity as the ambient light intensity of the environment. In yet another embodiment, the controller 244 may determine a brightest ambient light intensity among the first ambient light intensity and the second ambient light intensity and, use the brightest ambient light intensity as the ambient light intensity of the environment.

In yet another embodiment, the first indicator light 220 and the second indicator light 224 may be controlled independently from one another by the controller 244. For instance, the controller 244 may process the first digital input image (providing the first field of view 264 captured by the first image capturing device 248) to determine the first ambient light intensity and, may process the second digital input image (providing the second field of view 268 captured by the second image capturing device 252) to determine the second ambient light intensity. The controller 244 may consider the first ambient light intensity as the ambient light intensity of the environment, and accordingly generate a first control signal (of the one or more control signals) to adjust the at least one attribute (e.g., brightness) of the light output by the first indicator light 220. In addition, the controller 244 may consider the second ambient light intensity as the ambient light intensity of the environment, and accordingly generate a second control signal (of the one or more control signals) to adjust the at least one attribute (e.g., brightness) of the light output by the second indicator light 224.

Examples of the memory 280 may include a hard disk drive (HDD), and a secure digital (SD) card. Further, the memory 280 may include non-volatile/volatile memory units such as a random-access memory (RAM)/a read only memory (ROM), which may include associated input and output buses. The memory 280 may be configured to store various other instruction sets, datasets, for various other functions of the machine 104, along with the set of instruction, datasets, discussed above.

The controller 244 may include a processor 284 to process a variety of data (or inputs) such as the digital input images received from the image capturing devices 240, and the like. Examples of the processor 284 may include, but are not limited to, an X86 processor, a Reduced Instruction Set Computing (RISC) processor, an Application Specific Integrated Circuit (ASIC) processor, a Complex Instruction Set Computing (CISC) processor, an Advanced RISC Machine (ARM) processor, or any other processor.

Further, the controller 244 may include a transceiver 288. According to various embodiments of the present disclosure, the transceiver 288 may enable the controller 244 to communicate (e.g., wirelessly) with the image capturing devices 240, the indicator lights 180, etc., over one or more of wireless radio links, infrared communication links, short wavelength ultra-high frequency radio waves, short-range high frequency waves, or the like. Example transceivers may include, but not limited to, wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

INDUSTRIAL APPLICABILITY

When operating in high ambient lighting conditions, for example, in bright lighting conditions, brightness of the indicator lights 180 (e.g., the first indicator light 220 and the second indicator light 224) should be high enough for a site personnel (located at the worksite 100) and/or for an operator (e.g., the operator 120) located at the control station 128 to properly view the indicator lights 180 and accordingly, perform operations. However, when operating in low ambient lighting conditions, for example, in dim lighting conditions, such high brightness of the indicator lights 180 (used in the bright lighting conditions) may cause various operating issues. For instance, the site personnel or the operators of the nearby machines may be overwhelmed by the frequent flashing of such bright indicator lights 180, and hence may be unable to properly view the worksite 100 to perform operations. Such frequent flashing of the bright indicator lights 180 also may reflect from machines' surfaces (or from surrounding infrastructures) and back to the eyes of the operators or to the perception systems of the other nearby machines (e.g., the third track-type tractor 116). This may prevent the operators and/or the perception systems of the other nearby machines from properly viewing the worksite 100. The present disclosure provides the system 236 to control (e.g., adjust) the attributes (e.g., brightness) of light emitted by the indicator lights 180 based on the ambient lighting conditions. This allows the operators and/or perception systems of other nearby machines to view the worksite 100 without difficulty.

Figure 6:
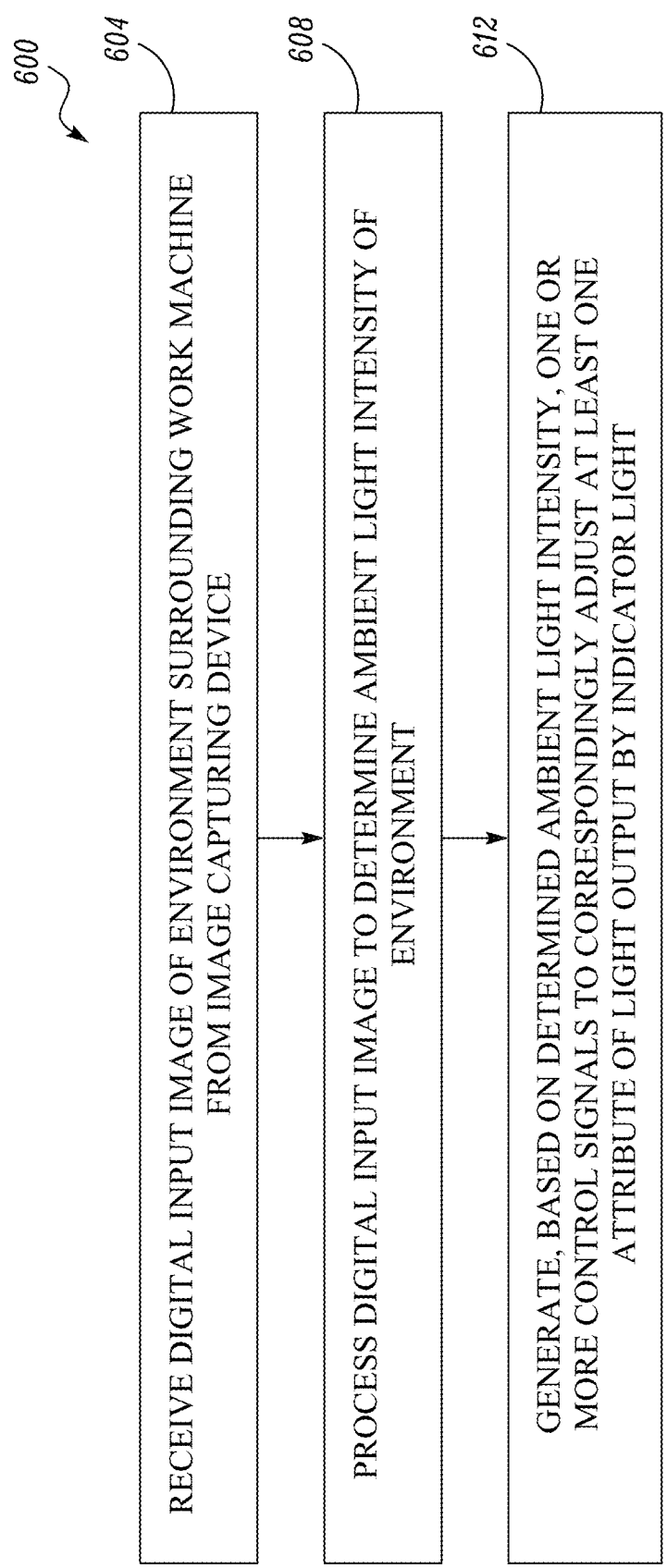
FIG. 6 depicts a flowchart illustrating a method for operating the indicator light, in accordance with an embodiment of the present disclosure.

Referring to FIG. 6, an exemplary method for operating the indicator light 180 mounted to the exterior 176 of the machine 104 (e.g., the first track-type tractor 108, the second track-type tractor 112, and the third-track type tractor 116) is discussed. The method is discussed by way of a flowchart 600 that illustrates exemplary steps (i.e., from 604 to 612) associated with the method. The method is also discussed in conjunction with FIGS. 1-5.

The method begins with the controller 244 receiving the digital input image of the environment surrounding the machine 104 from the image capturing device 240, at 604. For instance, the controller 244 may receive the first digital input image (covering the first field of view 264) from the first image capturing device 248, the second digital input image (covering the second field of view 268) from the second image capturing device 252, the third digital input image (covering the third field of view 272) from the third image capturing device 256, and the fourth digital input image (covering the fourth field of view 276) from the fourth image capturing device 260.

Subsequent to the receipt of the digital input image, the controller 244 may process the digital input image(s) to determine the ambient light intensity of the environment, at 608. For instance, the controller 244 may process the first digital input image (received from the first image capturing device 248) to determine the ambient light intensity of the environment. In another instance, the controller 244 may process the first digital input image, the second first digital input image, the third digital input image, and the fourth digital input image, to correspondingly determine the first ambient light intensity, the second ambient light intensity, the third ambient light intensity, and the fourth ambient light intensity, respectively. Subsequent to this, the controller 244 may compute an average of the first ambient light intensity, the second ambient light intensity, the third ambient light intensity, and the fourth ambient light intensity, and use the average as the ambient light intensity of the environment. In yet another instance, the controller 244 may determine a lowest ambient light intensity among the first ambient light intensity, the second ambient light intensity, the third ambient light intensity, and the fourth ambient light intensity, and use the lowest ambient light intensity as the ambient light intensity of the environment. In yet another embodiment, the controller 244 may determine a brightest ambient light intensity among the first ambient light intensity, the second ambient light intensity, the third ambient light intensity, and the fourth ambient light intensity, and use the brightest ambient light intensity as the ambient light intensity of the environment.

Based on the determined ambient light intensity of the environment, the controller 244 may generate one or more control signals to correspondingly adjust the at least one attribute of the light output by the indicator light 180 (e.g., the first indicator light 220 and the second indicator light 224), at 612. For instance, the controller 244 may determine the desired value of the attribute (e.g., brightness) of the light output by the indicator light 180 by using the look-up table correlating different levels of the ambient light intensity of the environment with corresponding desired values of the at least one attribute of the light output by the indicator light 180, as discussed above, and accordingly, generate control signal(s) based on the determined desired value. In other instances, the controller 244 may determine said desired value by using the interpolation technique or the look-up table correlating different ranges of the ambient light intensity of the environment with corresponding desired values of the at least one attribute of the light output by the indicator light 180, as discussed above, and accordingly generate control signal(s) based on the determined desired value.

By controlling the attributes of the light emitted by the indicator lights 180 based on the ambient lighting conditions, the system 236 facilitates the onsite personnel or the operator 120 operating the first track-type tractor 108 to clearly view the operating status of the other nearby machines, such as the second track-type tractor 112 and the third track-type tractor 116, at any period of time. This may enhance work efficiency and safety of the machines 104 operating at the worksite 100. Further, the system 236 eliminates a need to use dedicated light sensors to determine the ambient light conditions of the environment surrounding the machines 104, thereby reducing the cost of operation and maintenance of the machines 104. Furthermore, since the system 236 uses simple calculation techniques to determine the ambient light intensity of the environment, the computational power requirement for determining the ambient light intensity of the environment is low.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

It will be apparent to those skilled in the art that various modifications and variations can be made to the system, method, and/or the work machine of the present disclosure without departing from the scope of the disclosure. Other embodiments will be apparent to those skilled in the art from consideration of the specification and practice of the system, method, and/or the work machine disclosed herein. It is intended that the specification and examples be considered as exemplary only, with a true scope of the disclosure being indicated by the following claims and their equivalent.

What is claimed is:

1. A method for operating an indicator light mounted to an exterior of a work machine, the method comprising:
   receiving, by a controller, a digital input image of an environment surrounding the work machine from an image capturing device;
   processing, by the controller, the digital input image to determine an ambient light intensity of the environment; and
   generating, by the controller, based on the determined ambient light intensity, one or more control signals to correspondingly adjust at least one attribute of light output by the indicator light,
   wherein the image capturing device is a first image capturing device and the digital input image is a first digital input image having a first ambient light intensity, the method further including:
      receiving, by the controller, a second digital input image of the environment surrounding the work machine from a second image capturing device;
      processing, by the controller, the second digital input image to determine a second ambient light intensity of the environment;
      computing, by the controller, an average of the first ambient light intensity and the second ambient light intensity; and
      using, by the controller, the average as the ambient light intensity.

2. The method of claim 1, wherein the at least one attribute includes brightness of the light output by the indicator light.

3. The method of claim 1, wherein processing the digital input image to determine the ambient light intensity of the environment includes:
   computing, by the controller, an average intensity value of pixels of the digital input image; and
   using, by the controller, the average intensity value as the ambient light intensity of the digital input image.

4. The method of claim 1 wherein the one or more control signals are indicative of a desired value of the at least one attribute of the light output by the indicator light, the method further comprising:
   determining, by the controller, the desired value of the at least one attribute by using one or more datasets correlating different ranges of the ambient light intensity with corresponding values of the at least one attribute of the light output by the indicator light, the one or more datasets being stored in a memory associated with the controller.

5. The method of claim 1, wherein the method further comprises:
   determining, by the controller, a lowest ambient light intensity among the first ambient light intensity and the second ambient light intensity; and
   using, by the controller, the lowest ambient light intensity as the ambient light intensity.

6. The method of claim 1, wherein the indicator light is a first indicator light, the work machine including a second indicator light, and the method further comprising:
   generating, by the controller, based on the first ambient light intensity, a first control signal of the one or more control signals to correspondingly adjust the at least one attribute of the light output by the first indicator light; and
   generating, by the controller, based on the second ambient light intensity, a second control signal of the one or more control signals to correspondingly adjust at least one attribute of light output by the second indicator light.

7. A system for operating an indicator light mounted to an exterior of a work machine, the system comprising:
   an image capturing device configured to capture a digital input image of an environment surrounding the work machine; and a controller operatively coupled to the image capturing device, the controller configured to:
receive the digital input image;
process the digital input image to determine an ambient light intensity of the environment; and
generate, based on the determined ambient light intensity, one or more control signals to correspondingly adjust at least one attribute of light output by the indicator light
wherein the image capturing device is a first image capturing device and the digital input image is a first digital input image having a first ambient light intensity,
wherein the system further comprises a second image capturing device configured to capture a second digital image of the environment surrounding the work machine, and
wherein the controller is configured to:
receive the second digital input image,
process the second digital input image to determine a second ambient light intensity of the environment,
determine a lowest ambient light intensity among the first ambient light intensity and the second ambient light intensity, and
use the lowest ambient light intensity as the ambient light intensity.

8. The system of claim 7, wherein the at least one attribute includes brightness of the light output by the indicator light.

9. The system of claim 7, wherein the controller is configured to:
compute an average intensity value of pixels of the digital input image; and
use the average intensity value as the ambient light intensity of the environment.

10. The system of claim 7, wherein the one or more control signals are indicative of a desired value of the at least one attribute of the light output by the indicator light, and the controller is configured to:
determine the desired value of the at least one attribute by using one or more datasets correlating different ranges of the ambient light intensity with corresponding values of the at least one attribute of the light output by the indicator light, the one or more datasets being stored in a memory associated with the controller.

11. The system of claim 7, wherein the controller is configured to:
compute an average of the first ambient light intensity and the second ambient light intensity; and
use the average as the ambient light intensity.

12. The system of claim 7, the indicator light is a first indicator light, the work machine including a second indicator light, and
wherein the controller is configured to:
generate, based on the first ambient light intensity, a first control signal of the one or more control signals to correspondingly adjust the at least one attribute of the light output by the first indicator light; and
generate, based on the second ambient light intensity, a second control signal of the one or more control signals to correspondingly adjust at least one attribute of light output by the second indicator light.

13. A work machine comprising:
an exterior;
an indicator light mounted to the exterior and configured to output light indicative of an operating status of the work machine;
a system for operating the indicator light, the system for operating the indicator light including:
an image capturing device configured to capture a digital input image of an environment surrounding the work machine; and
a controller operatively coupled to the image capturing device, the controller configured to:
receive the digital input image;
process the digital input image to determine an ambient light intensity of the environment; and
generate, based on the determined ambient light intensity, one or more control signals to correspondingly adjust at least one attribute of light output by the indicator light,
wherein the image capturing device is a first image capturing device and the digital input image is a first digital input image having a first ambient light intensity, and the indicator light is a first indicator light,
wherein the system for operating the indicator light includes a second image capturing device configured to capture a second digital image of the environment surrounding the work machine, and the work machine includes a second indicator light, and
wherein the controller is configured to:
receive the second digital input image;
process the second digital input image to determine a second ambient light intensity of the environment;
generate, based on the first ambient light intensity, a first control signal of the one or more control signals to correspondingly adjust the at least one attribute of the light output by the first indicator light; and
generate, based on the second ambient light intensity, a second control signal of the one or more control signals to correspondingly adjust at least one attribute of light output by the second indicator light.

14. The work machine of claim 13, wherein the at least one attribute of the light output by the indicator light includes brightness of the light output by the indicator light.

15. The work machine of claim 13, wherein the one or more control signals are indicative of a desired value of the at least one attribute of the light output by the indicator light, and the controller is configured to:
determine the desired value of the at least one attribute of the light output by the indicator light by using one or more datasets correlating different ranges of the ambient light intensity with corresponding values of the at least one attribute of the light output by the indicator light, the one or more datasets being stored in a memory associated with the controller.

16. The work machine of claim 13, wherein the controller is configured to:
compute an average of the first ambient light intensity and the second ambient light intensity; and
use the average as the ambient light intensity.

17. The work machine of claim 13, wherein the controller is configured to:
determine a lowest ambient light intensity among the first ambient light intensity and the second ambient light intensity; and
use the lowest ambient light intensity as the ambient light intensity.

* * * * *